United States Patent
Wells (10) Patent No.: US 7,490,013 B2
(45) Date of Patent: Feb. 10, 2009

(54) POWER GRID FAILURE DETECTION SYSTEM AND METHOD

(75) Inventor: Charles H. Wells, Emerald Hills, CA (US)

(73) Assignee: OSIsoft, Inc., San Leandro, CA (US)

(*) Notice: Subject to any disclaimer, the term of this patent is extended or adjusted under 35 U.S.C. 154(b) by 682 days.

(21) Appl. No.: 11/008,632

(22) Filed: Dec. 8, 2004

(65) Prior Publication Data

US 2005/0141682 A1  Jun. 30, 2005

Related U.S. Application Data

(60) Provisional application No. 60/527,831, filed on Dec. 9, 2003.

(51) Int. Cl.
*H02M 7/44* (2006.01)
(52) U.S. Cl. .................... 702/60; 702/66; 324/76.21
(58) Field of Classification Search ............... 702/57, 702/58, 60, 66, 72, 75–77, 78; 324/76, 19, 324/76.21–76.24, 76.39, 76.77, 76.79; 700/22, 700/286, 292, 293, 294, 297
See application file for complete search history.

(56) References Cited

U.S. PATENT DOCUMENTS

| | | | |
|---|---|---|---|
| 4,137,496 A * | 1/1979 | Lind ..................... 324/76.74 |
| 4,300,182 A * | 11/1981 | Schweitzer, III .......... 361/79 |
| 4,349,878 A * | 9/1982 | Grimm ..................... 702/58 |
| 5,416,725 A * | 5/1995 | Pacheco et al. ........... 702/176 |
| 5,459,675 A * | 10/1995 | Gross et al. .............. 702/183 |
| 5,604,679 A * | 2/1997 | Slater ..................... 702/125 |
| 5,784,441 A | 7/1998 | Davis et al. ........... 379/106.01 |
| 6,185,482 B1 * | 2/2001 | Egolf et al. ............... 700/293 |
| 6,754,597 B2 * | 6/2004 | Bertsch et al. ............. 702/57 |
| 6,812,586 B2 | 11/2004 | Wacknov et al. ........... 290/52 |
| 2003/0154225 A1 * | 8/2003 | Neubert ................... 708/446 |
| 2005/0096759 A1 * | 5/2005 | Benjamin et al. ........... 700/62 |
| 2006/0047452 A1 * | 3/2006 | Shim et al. ................. 702/77 |

* cited by examiner

*Primary Examiner*—Manuel L Barbee
(74) *Attorney, Agent, or Firm*—Lumen Patent Firm

(57) ABSTRACT

Electric power grids are usually constantly monitored for AC frequency. The monitoring of the AC frequency, however, usually does not reveal information that would indicate impending failure in the power grid. This document describes several techniques for detecting impending failure in the power grid by examining line data in the frequency domain.

47 Claims, 10 Drawing Sheets

POWER GRID FAILURE DETECTION SYSTEM AND METHOD

RELATED APPLICATIONS

This application claims priority under 35 U.S.C. § 119(e) to provisional application number 60/527,831 filed on Dec. 9, 2003 titled "Real-time information extraction from time series data."

FIELD

The invention relates to electric power grids, and, more specifically, to power grid failure detection.

BACKGROUND

Electric power grids that carry electrical power to homes and businesses are sometimes prone to failure, resulting in a blackout for the affected areas. The causes for grid failure include imbalances between load and power generation.

Power grids are usually constantly monitored for alternating current (AC) frequency. Power grid operators try to keep the AC frequency as close to a fixed frequency as possible. For example, the nominal AC frequency of the power grid in the US is 60 Hz, while in Europe and parts of Japan, the nominal AC frequency of the power grid is 50 Hz. The overall accuracy of the AC frequency is such that most AC powered clocks use the AC power as their source of time increment.

While the AC frequency is nominally set at a certain value, the actual AC frequency drifts around the nominal value as a result of load and generation effects.

Figure 1:
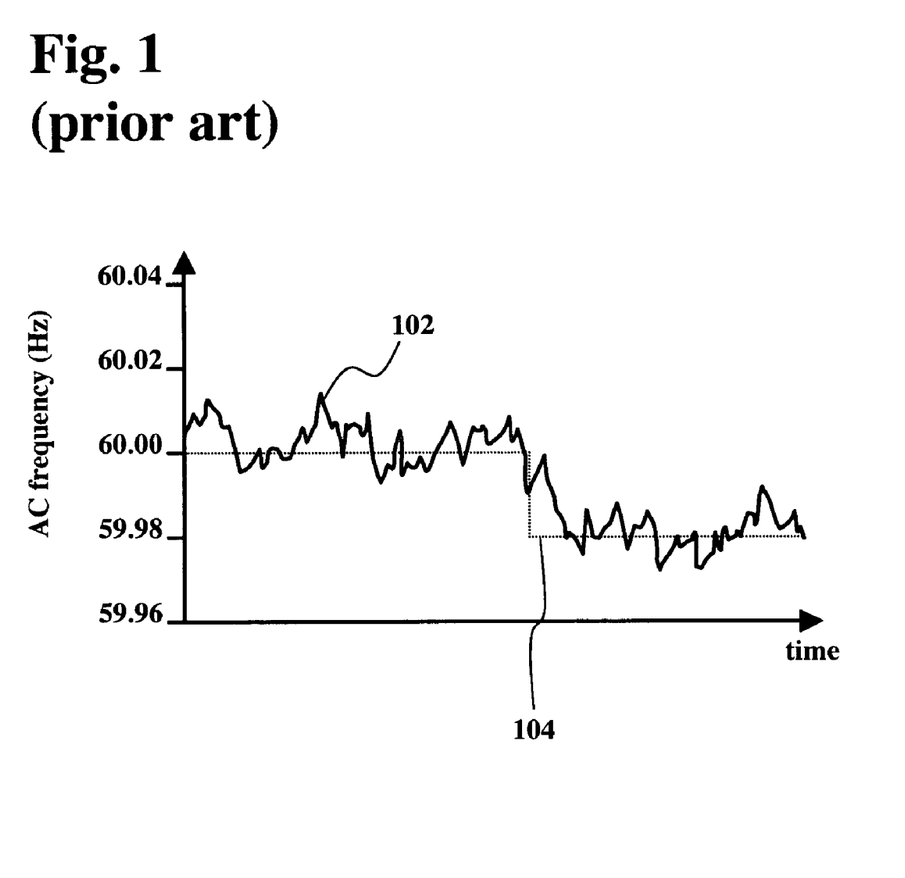

FIG. 1 shows an example of AC frequency vs. time. Power grid operators change the scheduled AC frequency 104 to deal with different parameters of the grid and to keep the overall average of the AC frequency at the nominal value. As seen in FIG. 1, the actual AC frequency 102 varies widely. An AC frequency error of ±0.02 Hz is well within the bounds of normal operation. The drift of the AC frequency, or drift frequency, refers to the deviation of the AC frequency from the nominal value. Typically, the drift frequency does not exceed 0.1 Hz in a stable system.

The monitoring of the AC frequency, however, usually does not reveal information that would indicate impending failure in the power grid until it is too late. Thus, there is a need for a power grid failure detection system that can warn operators of impeding failures or even automatically take emergency action.

SUMMARY

This document describes a system that uses multiple sensors to gather frequency and phase information that feed an analysis block to determine grid instabilities.

BRIEF DESCRIPTION OF DRAWINGS

Description

While current techniques that examine the time based output of the power grid may not be very good at detecting problems in the grid, novel frequency domain (sometimes referred to as the harmonic domain, spectral domain, or LaPlace domain) based techniques discussed below are quite good at detecting grid instabilities. In order to avoid confusion between time domain frequencies and the frequency domain, this application will refer to the harmonic domain instead of the frequency domain (they are the same). Using the harmonic based techniques to alert power grid operators to potential problems, or even having automated systems automatically take appropriate actions when grid problems arrive will dramatically reduce the chance of grid instabilities causing system failures and blackouts. One advantage to the harmonic based technique is that grid instabilities can be detected from a limited data set (for example, data gathered with only one sensor measuring frequency).

The first step is to monitor the power grid at one or more locations. Sensors should measure AC frequency. Sensors can also gather other useful data such as phase, voltage, current, and power. The technique described below will work on any continuous measured variables. Preferably, the frequency would be measured with a resolution of at least 0.05 Hz, and the phase would be measured with a resolution of at least 0.5 degrees, where one cycle has 360 degrees. Time should also be measured so that data from different sensors can be correlated. One way to have an accurate time stamp is to use global positioning system (GPS) signals. Preferably, each control area (sometimes referred to as a load pocket) would have at least one sensor. A control area is a power grid component. For example, California has multiple control areas and the US has roughly 140 control areas. By measuring what the grid is doing in the different control areas, a smart system can detect unstable interactions between the control areas.

The sensors preferably have a high sampling rate. One example is once per second. Another example is 20 times per second. Yet another example is 60 times per second. The higher the sampling rate, the lower the noise in the signal, especially in higher order harmonics.

Figure 2:
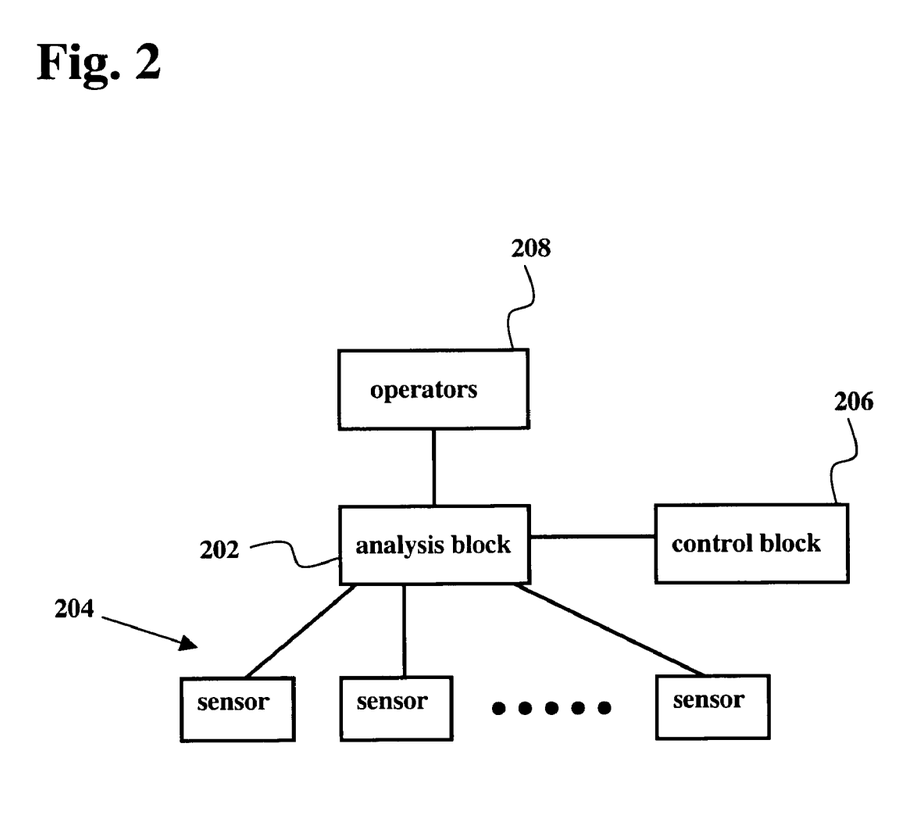

FIG. 2 shows an example of a power grid failure detection system. An analysis block 202 use connected to one or more sensors 204. Optionally, the analysis block 202 may be connected to a control block 206. The control block 206 can be used to automatically take corrective action in order to prevent a power grid failure. Possible corrective actions include increasing power generation or isolating control areas. Also optionally, the analysis block 202 may be connected with human operators 208. For example, the analysis block may be configured to alert human operators 208 to the possibility of impending power grid failure. The human operators 208 would then be able to take corrective action.

Data may be sent from the sensors 204 to the analysis block 202 by various means including via radio, via the internet, and via dedicated communication lines.

While the data is gathered in the time domain, the analysis is performed in the harmonic domain. For illustration purposes, this will be referred to as the harmonic content of the signal. One can use fast Fourier transforms (FFT's) to quickly convert the data from the time domain to the harmonic domain. One can also use an inverse FFT to return from the harmonic domain to the time domain. Once the data is in the harmonic domain, analysis can proceed.

Figure 3A:
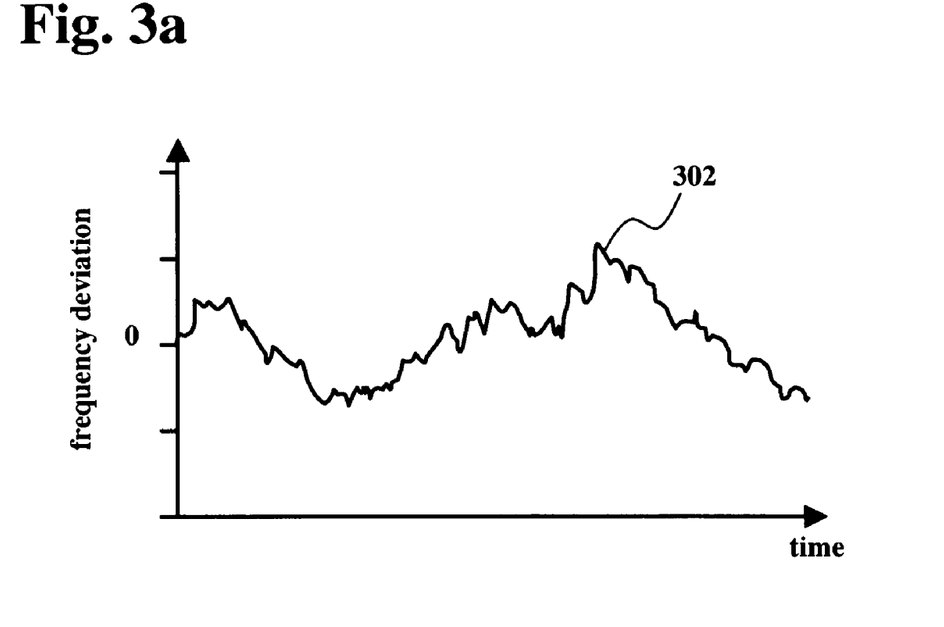

FIG. 3A shows an example of the line frequency deviation in the time domain. The line frequency 302 oscillates according to the random loads and generation on the power grid. One can easily see noise in the line frequency deviations 302, but detecting impending grid failure from the time domain data can be very difficult. The analysis approach works equally well on the full value of the signal, rather than just the deviations from nominal. Therefore, it is advantageous to convert the time domain data to harmonic domain data. To convert data in the time domain to the harmonic domain, one may use FFT's (older, pre-Cooley-Tukey algorithm FFT's are equally useable, but take more computer time).

Figure 3B:
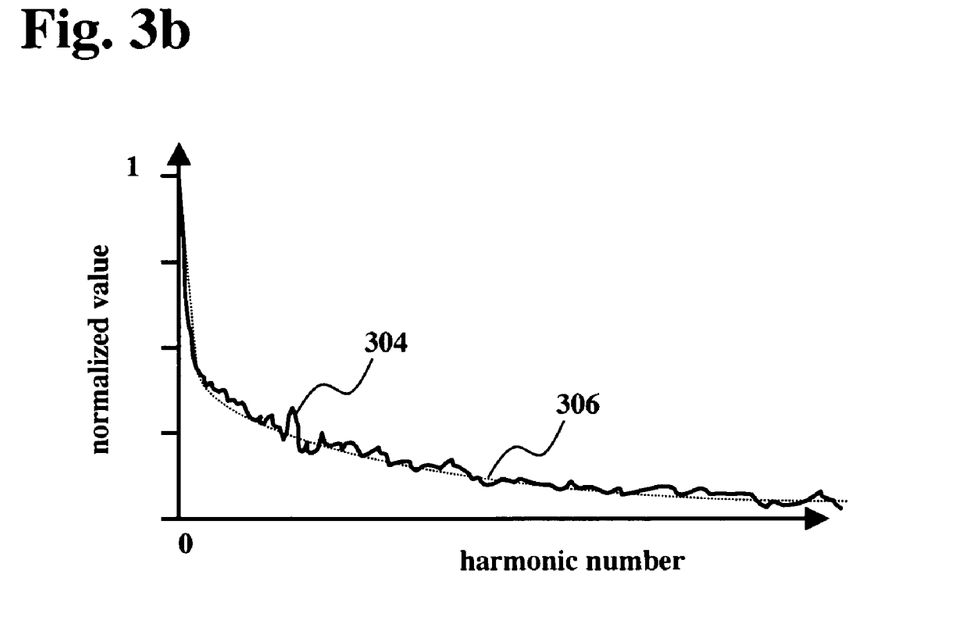

FIG. 3B shows an example of the line frequency in the harmonic domain. The frequency harmonic amplitude curve 304 starts at the DC level. The DC level is a constant with an infinite period. The spectral content of the time domain frequency signal is shown in FIG. 3B. While it is certainly possible to display the entire harmonic domain, most of the critical information required for detecting grid instability is contained in the harmonic content in the range of 0.01 Hz to 1 Hz. (this corresponds to lower harmonic numbers). This includes electromechanical oscillations as well as oscillations induced by the grid operators that may include very long periods (for example, periods as long as one hour). These artifacts show up on the left hand side of FIG. 3B. Thus, FIG. 3B shows the harmonic content of the frequency signal. The normalized harmonic amplitude curve 306 represents the average "power" in the grid at each harmonic oscillation. By comparing the harmonic amplitude curve 304 with the normalized amplitude curve 306, one can detect spikes, or peaks, in the harmonic domain. The normalized amplitude curve 306 is sometimes referred to as a trend line.

While spikes in the harmonic curve 304 are normal in the course of operation of a power grid, spikes that linger too long or are too under damped may indicate instability in the power grid. Generally, a peak with a damping ratio less than 0.7 may indicate grid instability. In addition, peaks that last longer than a predetermined amount of time (for example, 30 seconds) may indicate grid instability.

Figure 4:
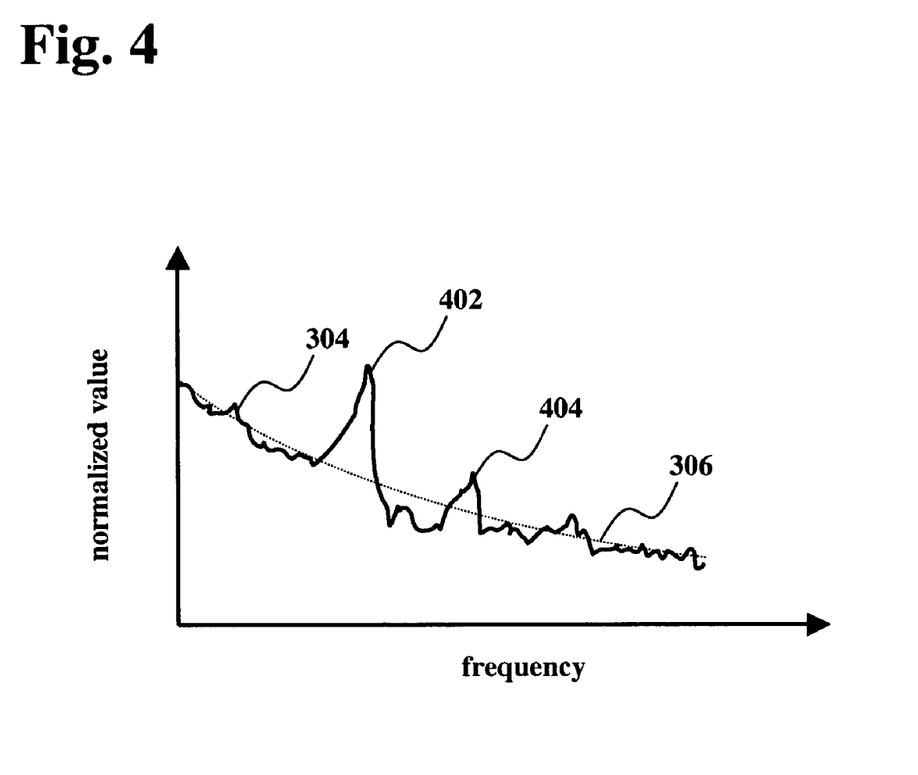

FIG. 4 shows an example of a small cross-section of harmonic domain data. In this example, by comparing the harmonic curve 304 with the normalized amplitude curve 306, one can see two large peaks 402, 404. In this example, the first peak 402 is larger than the second peak 404. If one calculates the proportion that a peak exceeds the normalized value for a specific harmonic number, one can get a better sense of any potential instability is in the grid. For example, if one calculates a ratio of the amplitude of the first peak 402 to the amplitude of the normalized amplitude curve 306 at the same frequency of the first peak 402, one can quickly detect potential grid instability's. For example, for a peak value of 0.52 at 0.1 Hz with a normalized curve amplitude of 0.26 at 0.1 Hz, the ratio would be 2.0. A ratio of 2.25 or greater for the first peak 402 may indicate grid instability. Where there are pairs of peaks, a ratio of 1.5 or greater for the second peak 404 may indicate grid instability.

Figure 5:
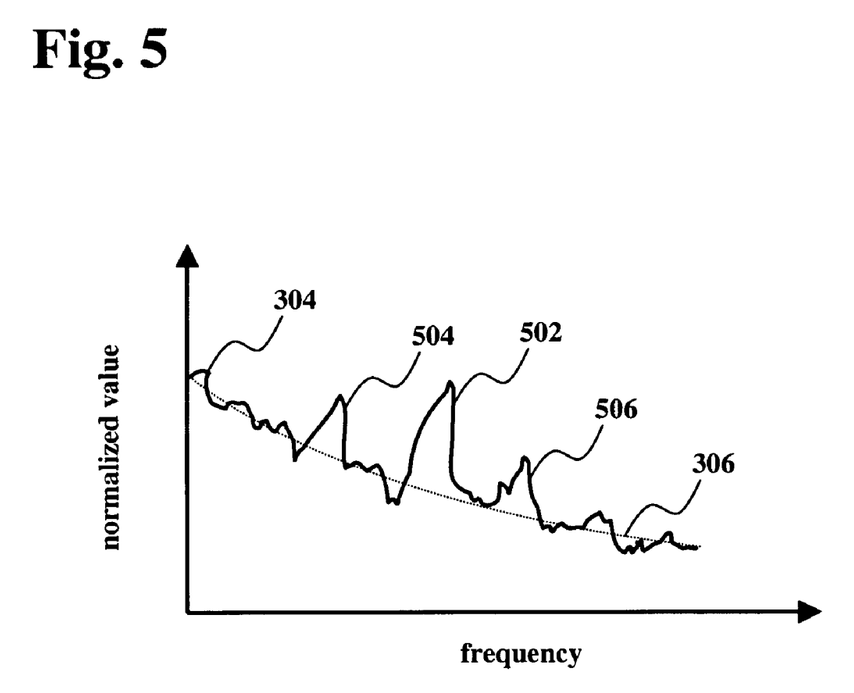

FIG. 5 shows an example of a cluster of peaks. A cluster of peaks comprises a main peak 502 with one or more side peaks 504, 506. In the example shown in FIG. 5, the main peak 502 has a one-sided peak 504 on the left and the other side peak 506 on the right of the main peak 502. Of course, other patterns are possible. The combination of the main peak flanked by smaller peaks is sometimes referred to as a Hopf bifurcation.

If one detects a ratio of the main peak 502 to the normalized amplitude curve 306 greater than 1.5, where both amplitudes are measured at the same frequency, then the power grid may be unstable. In addition, if one detects a ratio of a side peak (504 or 506) to the normalized amplitude curve 306 greater than 1.1, where both amplitudes are measured at the same frequency, then the power grid may be unstable. In addition, if either the main peak 502 or any side peaks 504, 506 exceed any respective amplitude ratio limits for a predetermined amount of time, then the grid may be unstable. For example, for a first limit of 1.2, a second limit of 1.15, and a predetermined amount of time of 30 seconds, if either the main peak 502 exceeds the ratio of 1.2 or any of the side peaks exceed the ratio of 1.15 for 30 seconds, then the grid may be unstable. The actual limits and predetermined amount of time will be determined by engineers after observing stable and unstable operation of the power grid in question.

Figure 6:
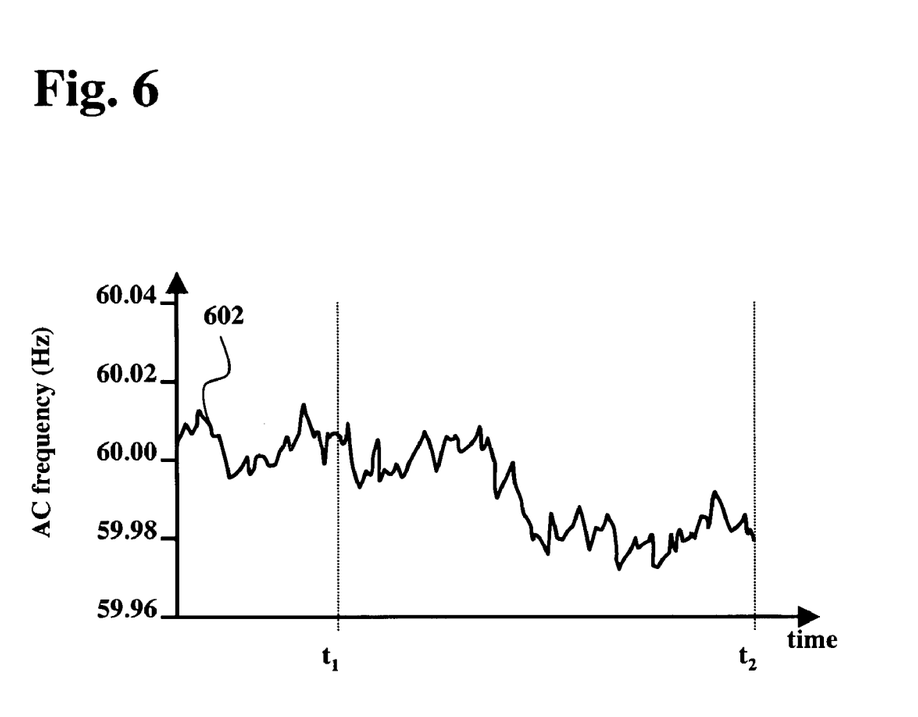

FIG. 6 shows an example of the time window. In this example, the time domain based data 602 is shown. A moving time window comprises all the data from the current time, t2, to a relative time in the past. When a new data point is recorded, the oldest data point is dropped. In this way, the data window "moves," and, therefore has the name moving window. Ring buffers, which are well known to computer scientists, are very useful for implementing moving windows. For example, one may choose a moving time window with 4096 data points, each data point measured at 50 ms intervals. Another example is a moving window of five minutes. Yet another example is a moving window of 10 minutes. The actual size and the resolution of the moving window may be determined by an engineer. The number of the points in the moving window is preferred to be a power of two (if not an exact power of two, the moving window is preferably "padded" with the oldest number in the window to fill the window with an exact power of two measurement points). One advantage to using a power of two for the number of data points is that a bitwise shift can be used to very quickly calculate an average of all of the points in the moving window.

By using a moving window to collect and analyze data, one can predict grid failure in certain cases. For example, if an average of absolute phase difference in a moving window (that exceeds a predetermined value) between a pair of sensors exists, then the grid may be unstable.

Figure 7:
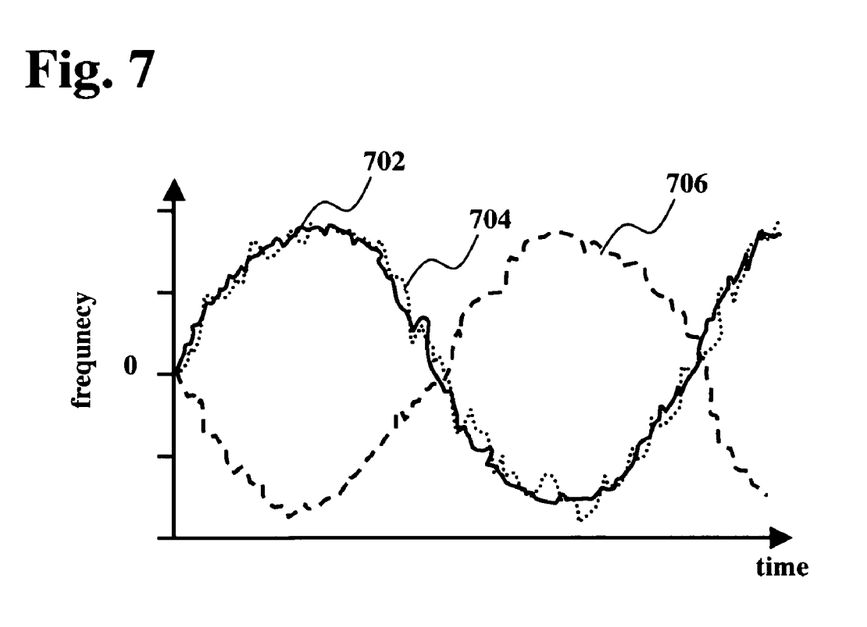

FIG. 7 shows an example of frequency data. Three sets of frequency data are shown in the time domain. One can see that a first set of line data 702 correlates fairly well with a second set of line data 704. However, both sets 702, 704 correlates negatively (negatively, i.e. one signal goes up the other goes down) with a third set of line data 706. If the correlation coefficient between a pair of sensors is low, then there may be instability in part of the grid. One example of a correlation coefficient (below which the grid may be unstable) is whenever it is less than 0.9. This is often called coherency and is commonly used in the power system field. Preferably, correlation coefficients between sensors are calculated at least once per second. It may be advantageous to use a moving window of data for the purposes of determining a correlation coefficient. The correlation coefficient is determined using standard statistical means. Additionally, the correlation function may be used to compare two signals. This calculation provides additional information about the nature of the relationship between the two signals.

Figure 8A:
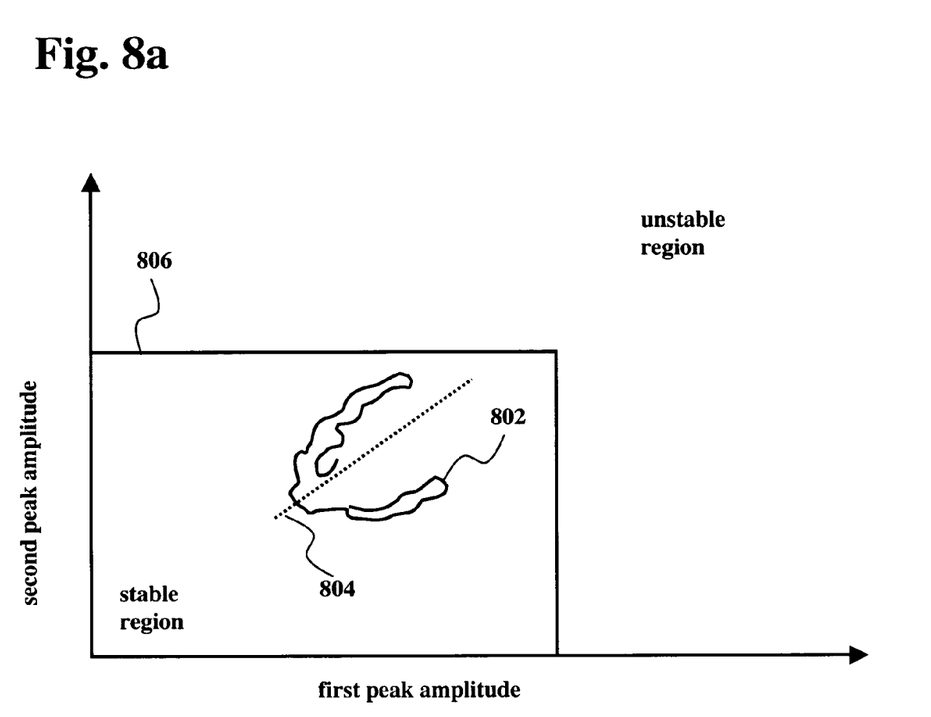

FIG. 8A shows an example of a stable "snails trail." A snail trail 802 refers to a continuous plot with regard to time of a first peak amplitude on the x-axis and a second peak amplitude on the y-axis, the time duration of the window determine the "length" of the snail's trail. Thus, for every successive data set (or every n sets) the first and second peak amplitudes are plotted. The snail trail 802 shows the relative nature of the first and second peak amplitudes over time. A trend line 804 shows that the first peak and the second peak are correlated with a correlation coefficient of approximately one (i.e. 45 degree slope). The slope of the trend line is the correlation coefficient between the two peaks. A stable region 806 is shown with upper limits for both the first and second peak amplitudes. If neither peak amplitude exceeds the balance of the stable region, then the power grid is stable. There is some underlying non-linear stability theory behind this approach, often referred to as Lyapunov stability regions. If, however, either or both of the peak amplitudes exceed the limits of the stable region 806 for a certain amount of time, then the grid may be unstable. One example for the certain amount of time, which may be predetermined, is 30 minutes.

Figure 8B:
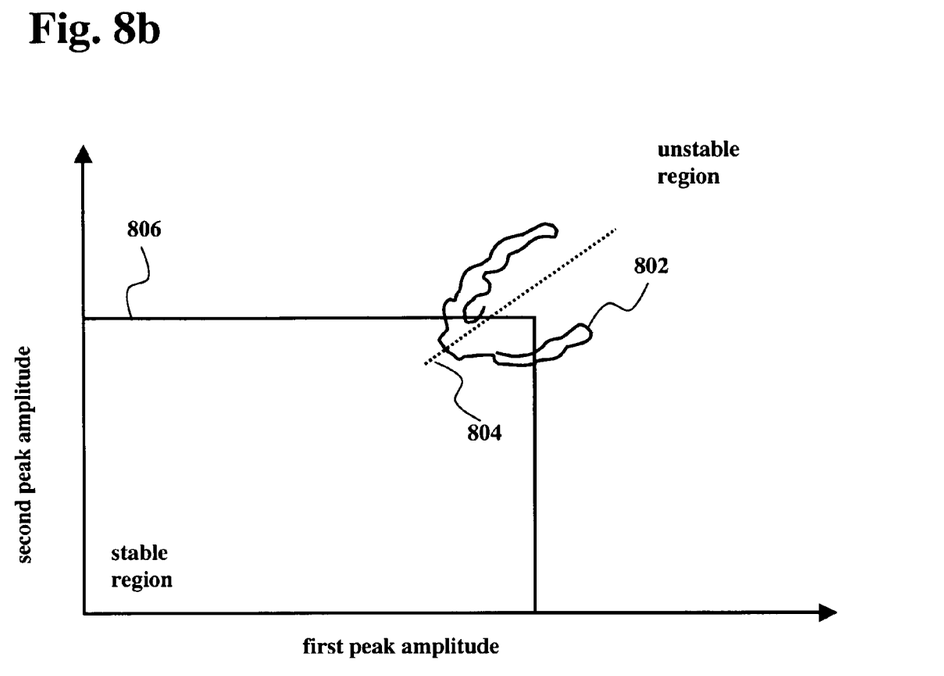

FIG. 8B shows an example of a potentially unstable snail trail. In this example, the snail trail 802 goes in and out of the stable region 806. If the snail trail 802 goes into the unstable region for a certain amount of time, then the power grid may be unstable. The actual limits of the stable region 806 may change with the amount of time that snail trail exists in a particular region. For example, for first and second peak amplitude limits of 10 and eight respectively, grid instability may be indicated when the snail trial exceeds either limit for more than 10 seconds. But the first and second peak amplitude limits may grow to 20 and 15 respectively, for example, for measured intervals of one minute. Thus, the limits of the stable region may change with the measured time interval. In this way, both short duration, high amplitude peaks and long duration, low amplitude peaks may be detected as indicating grid instability.

Figure 8C:
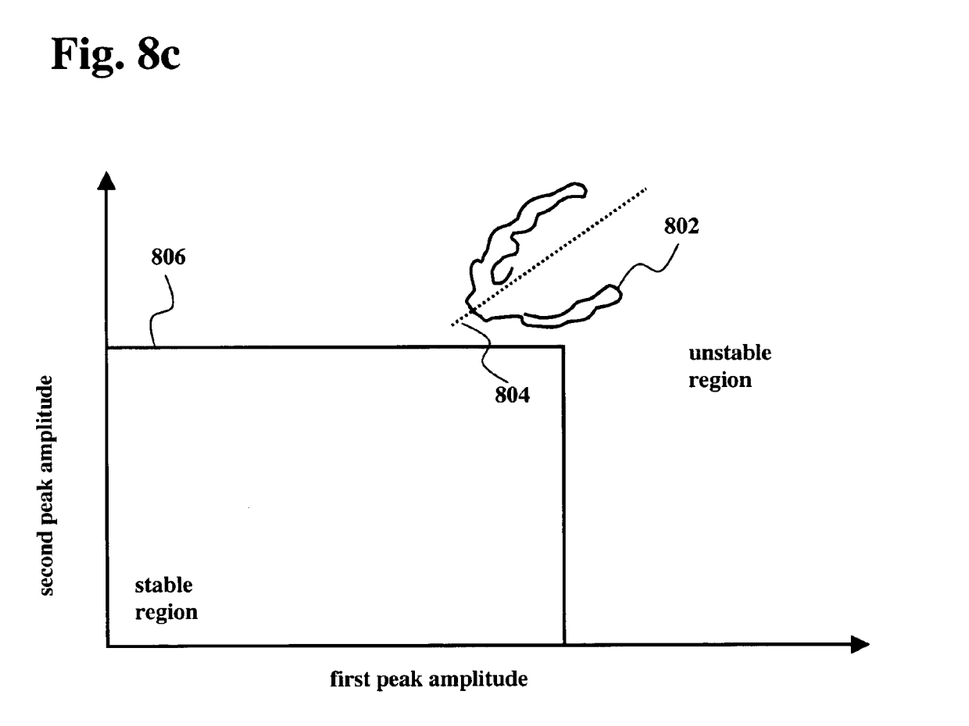

FIG. 8C shows an example of the unstable snail trail. In this example the snail trail 802 exists in the unstable region for the measured duration, i.e. the entire snail trail is outside the stable region. Thus, this unstable grid situation will be detected, as one or both of the peak amplitudes will exceed their respective limits for a certain amount of time.

Another way to detect power grid instability is to use an autoregressive model. One way to do this is to compute a moving window autoregressive model (Jenkins and Reinsel, 1994, *Time Series Analysis, Forecasting and Control*, 3rd ed. Prentice Hall, Englewood Cliffs, N.J.) for each measurement. The width of the moving window is determined by the period of interest. The purpose of building the autoregressive model is to provide early detection of instability in the grid. The order of the model can be determined using historical frequency or phase data. A separate model can be used for both phase and frequency. Determining the order of a particular model is accomplished by determining the "best" order of the autoregressive model using historical data. The best order is determined by incrementally increase the order until the "innovations" are white noise. Once the order is determined, the model is used to compare the difference between the measured value and the value predicted from the autoregressive model. The moving window innovations (or residuals) are continually tested for "whiteness" using the "Akaiki" chi squared test. If they are not white noise, then the grid may be unstable. This implies that the network is not behaving as it did over the past. A review of autoregressive models of frequency or phase is outlined below.

$$x_i = \sum_{j=1}^{N} a_j x_{i-j} \qquad \text{Eq. 1}$$

Where the coefficients of Eq. 1 are computed off-line using least squares. Typically, the history length used in the maximum likelihood process in at least two times the order of the autoregressive model. For example, if N=3, the history length would be at least 6.

For frequency or phase data, the order might be between 3 and 6 and the history length would preferably be up to 200 seconds. Once the values of $a_j$ are found, the forecast value that is one sample in the future is given by $$\hat{x}_{i+1} = \sum_{j=1}^{N} \hat{a}_j x_{i+1-j} \qquad \text{Eq. 2}$$

where $\hat{x}_{i+1}$ is the forecasted value one step ahead and $\hat{a}_j$ are the coefficients in the autoregressive model. Let $z_{i+1}$ be the next measured value of frequency or phase and $$e_{i+1} = z_{i+1} - \hat{x}_{i+1} \qquad \text{Eq. 3}$$

is the residual or "innovation." The model is usually valid as long as the innovation sequence remains white noise. This can be determined by the "Akaiki" Chi Squared test. This is preferably performed by autocorrelating the innovation sequence and computing the sum of the first 5 components. For example, if the sum is less than 1.25, then the model is valid. The actual value of the sum of the elements should be less than this, but in a noisy environment, 1.25 is a reasonable number based on actual field experience.

It will be apparent to one skilled in the art that the described embodiments may be altered in many ways without departing from the spirit and scope of the invention. Accordingly, the scope of the invention should be determined by the following claims and their equivalents.

What is claimed is:

1. A power grid monitoring system comprising:
   at least one power line sensor, each sensor measuring frequency of alternating current carried by the power grid; and
   an analysis block, the analysis block processing data gathered by the at least one sensor, the analysis block determining instability in the power grid,
   where the analysis block converts sensor data from a time based domain to a frequency domain,
   where the analysis block identifies peaks in the frequency domain,
   where identified peaks with dampening ratios less than 0.7 indicate grid instability.

2. The system of claim 1, further comprising a control block, the control block automatically adjusting control parameters of the power grid based on the grid instability.

3. The system of claim 1, where operators are alerted to the grid instability.

4. The system of claim 1, where the at least one sensor sends data to the analysis block via an internet connection.

5. The system of claim 1, where the at least one sensor measures data at least once per second.

6. The system of claim 1, where the at least one sensor measures data at least 20 times per second.

7. The system of claim 1, where the at least one sensor measures data at least 60 times per second.

8. The system of claim 1, where the at least one sensor measures frequency with a resolution of at least 0.05 Hz.

9. The system of claim 1, where the at least one sensor measure phase.

10. The system of claim 9, where the at least one sensor measures phase with a resolution of at least 0.5 degrees.

11. The system of claim 1, where the at least one sensor synchronizes time based on GPS signals.

12. The system of claim 1, where each control area of the power grid has at least one associated sensor.

13. The system of claim 1, where the analysis block uses fast Fourier transforms for the data conversion.

14. The system of claim 1, where identified peaks lasting more than a predetermined amount of time indicate grid instability.

15. The system of claim 1, where identified peaks comprise a first peak, where the analysis block calculates a first ratio of the first peak amplitude to a first normalized amplitude, where the first ratio being at least 2.25 indicates grid instability.

16. The system of claim 15, where identified peaks further comprise a second peak, where the analysis block calculates a second ratio of the second peak amplitude to a second normalized amplitude, where the second ratio being at least 1.5 indicates grid instability.

17. The system of claim 1, where identified peaks comprise a Hopf bifurcation.

18. The system of claim 1, where identified peaks comprise a cluster of peaks.

19. The system of claim 18, where said cluster comprises:
  a central peak; and
  at least one side peak.

20. The system of claim 19, where the analysis block calculates a ratio of a central peak amplitude to a corresponding normalized amplitude, where the ratio being at least 1.5 indicates grid instability.

21. The system of claim 19, where the analysis block calculates a ratio of at least one side peak amplitude to at least one corresponding normalized amplitude, where the ratio being at least 1.1 indicates grid instability.

22. The system of claim 1, where identified peaks comprise a first peak and a second peak, where a measured state consists of:
  a) the first peak exceeding a first limit; and/or
  b) the second peak exceeding a second limit,
  where the measured state existing for a predetermined amount of time indicates grid instability.

23. The system of claim 22, where the predetermined amount of time comprises 30 minutes.

24. The system of claim 22, where the first and second limits vary with the measured duration of the predetermined amount of time.

25. The system of claim 1, where the analysis block cross-correlates frequency data gathered by the at least one sensor.

26. The system of claim 25, where frequency data with low correlation indicates grid instability.

27. The system of claim 25, where correlation ratios below 0.9 indicate grid instability.

28. The system of claim 25, where frequency correlations are calculated at least once per second.

29. The system of claim 25, where the analysis block uses a moving window of data for correlation calculations.

30. The system of claim 1, where the analysis block calculates a moving window average of absolute phase difference between at least one pair of sensors, where the average indicates grid instability if the average exceeds a predetermined threshold.

31. The system of claim 30, where moving window comprises a predetermined amount of time.

32. The system of claim 30, where moving window comprises at least 5 minutes.

33. The system of claim 30, where moving window comprises at least 10 minutes.

34. The system of claim 1, where the analysis block calculates a moving window autoregressive model on signal data.

35. The system of claim 34, where a lack of whiteness of autoregressive model residuals indicates grid instability.

36. A method of detecting instability in a power grid comprising:
  collecting data from at least one sensor, wherein the data represent measured frequency of alternating current carried by the power grid;
  converting the data to a frequency domain; and
  identifying characteristics in the data that indicate instability, wherein identifying characteristics in the data comprises identifying a first peak in the frequency domain with an amplitude at least 2.25 times a first normalized amplitude.

37. The method of claim 36, further comprising alerting power grid operators to grid instabilities.

38. The method of claim 36, further comprising automatically adjusting power grid controls to correct grid instabilities.

39. The method of claim 36, where converting the data to a frequency domain comprises using fast Fourier transforms to convert the data.

40. The method of claim 36, where identifying characteristics in the data comprises identifying peaks in the frequency domain.

41. The method of claim 36, where identifying characteristics in the data comprises identifying a second peak in the frequency domain with an amplitude at least 1.5 times a second normalized amplitude.

42. The method of claim 36, where identifying characteristics in the data comprises:
  identifying a first peak in the frequency domain with an amplitude at least 1.5 times a first normalized amplitude; and
  identifying a second peak in the frequency domain with an amplitude at least 1.1 times a second normalized amplitude.

43. The method of claim 36, where identifying characteristics in the data comprises identifying peaks in the frequency domain with dampening ratios less than 0.7.

44. The method of claim 36, where identifying characteristics in the data comprises identifying sensor data with low correlation.

45. The method of claim 36, where identifying characteristics in the data comprises identifying a phase difference between a pair of sensors that exceeds a predetermined threshold.

46. The method of claim 36, where identifying characteristics in the data comprises identifying a lack of whiteness of autoregressive model residuals.

47. A power grid monitoring system comprising:
  at least one power line sensor, each sensor measuring frequency of alternating current carried by the power grid; and
  an analysis block, the analysis block processing data gathered by the at least one sensor, the analysis block determining instability in the power grid,
  where the analysis block calculates a moving window average of absolute phase difference between at least one pair of sensors, where the average indicates grid instability if the average exceeds a predetermined threshold,
  where the moving window comprises a predetermined amount of time,
  where the moving window comprises at least 5 minutes.

* * * * *